US012190806B2

(12) United States Patent
He et al.

(10) Patent No.: US 12,190,806 B2
(45) Date of Patent: Jan. 7, 2025

(54) DISPLAY PANEL AND DISPLAY PANEL DRIVING METHOD

(71) Applicant: Xiamen Tianma Display Technology Co., Ltd., Xiamen (CN)

(72) Inventors: Shui He, Xiamen (CN); Shanshan Zheng, Shanghai (CN); Jinjin Yang, Xiamen (CN); Jiansheng Zhong, Xiamen (CN); Qiaoling Zhong, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/083,328

(22) Filed: Dec. 16, 2022

(65) Prior Publication Data

US 2024/0087518 A1 Mar. 14, 2024

(30) Foreign Application Priority Data

Sep. 9, 2022 (CN) ......................... 202211103061.1

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01); *G09G 2300/0819* (2013.01); *G09G 2300/0861* (2013.01); *G09G 2310/0286* (2013.01); *G09G 2310/061* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 2011/0084946 | A1* | 4/2011 | Park | G09G 3/3677 345/76 |
| 2017/0124941 | A1* | 5/2017 | Na | G09G 3/2092 |
| 2019/0189053 | A1* | 6/2019 | Kim | G09G 3/3266 |
| 2020/0226978 | A1* | 7/2020 | Lin | H01L 29/7869 |
| 2020/0312223 | A1* | 10/2020 | Yuan | G09G 3/32 |
| 2021/0104196 | A1* | 4/2021 | Yuan | G09G 3/3258 |

(Continued)

*Primary Examiner* — Dorothy Harris
(74) *Attorney, Agent, or Firm* — Anova Law Group, PLLC

(57) ABSTRACT

A display panel including a pixel circuit and a light-emitting element, the pixel circuit including a driving transistor, a data writing transistor, a threshold compensation transistor, a first reset transistor, a bias transistor, and a light-emitting control module, the data writing transistor being electrically connected to a first terminal of the driving transistor, the threshold compensation transistor being connected in series between a gate of the driving transistor and a second terminal of the driving transistor, and configured to detect and self-compensate a threshold voltage deviation of the driving transistor, the first reset transistor and the bias transistor being electrically connected to the second terminal of the driving transistor, the light-emitting control module being connected in series with the driving transistor and the light-emitting element to control whether a driving current flows through the light-emitting element, the data writing transistor and the first reset transistor having the same transistor type.

15 Claims, 10 Drawing Sheets

(56) References Cited

U.S. PATENT DOCUMENTS

| | | | | |
|---|---|---|---|---|
| 2021/0134917 | A1* | 5/2021 | Li | G09G 3/3266 |
| 2021/0150985 | A1* | 5/2021 | Li | G09G 3/3233 |
| 2021/0158755 | A1* | 5/2021 | Li | G09G 3/3266 |
| 2021/0280130 | A1* | 9/2021 | Wang | G09G 3/3233 |
| 2022/0310013 | A1* | 9/2022 | Na | G09G 3/3233 |
| 2023/0031984 | A1* | 2/2023 | Wang | G09G 3/3233 |
| 2023/0098040 | A1* | 3/2023 | Zhou | G09G 3/3233<br>345/55 |

* cited by examiner

DISPLAY PANEL AND DISPLAY PANEL DRIVING METHOD

CROSS-REFERENCE TO RELATED APPLICATIONS

This application claims the priority of Chinese patent application No. 202211103061.1, filed on Sep. 9, 2022, the entire content of which is incorporated herein by reference.

TECHNICAL FIELD

The present disclosure relates to the field of display technology and, more specifically, to a display panel and a driving method thereof.

BACKGROUND

Organic light-emitting display devices have the advantages of self-luminescence, low driving voltage, high luminous efficiency, fast response speed, compactness, and high contrast ratio, and are considered to be the next-generation display devices.

A pixel in an organic light-emitting display device includes a pixel circuit and a light-emitting element. A driving transistor in the pixel circuit can generate a driving current, and the light-emitting element can emit light in response to the driving current.

However, existing circuit structure of the pixel circuit requires multiple groups of shift register circuits to control the pixel circuit, which is not beneficial to the narrow frame design of the display panel.

SUMMARY

One aspect of the present disclosure provides a display panel. The display panel includes a pixel circuit, the pixel circuit including a driving transistor, a data writing transistor, a threshold compensation transistor, a first reset transistor, a bias transistor, and a light-emitting control module; and a light-emitting element. The data writing transistor is electrically connected to a first terminal of the driving transistor. The threshold compensation transistor is connected in series between a gate of the driving transistor and a second terminal of the driving transistor, and configured to detect and self-compensate a threshold voltage deviation of the driving transistor. The first reset transistor is electrically connected to the second terminal of the driving transistor. The bias transistor is electrically connected to the second terminal of the driving transistor. The light-emitting control module is respectively connected in series with the driving transistor and the light-emitting element to control whether a driving current flows through the light-emitting element. The data writing transistor and the first reset transistor have the same transistor type.

Another aspect of the present disclosure provides a display panel, the display panel includes a pixel circuit, the pixel circuit including a driving transistor, a data writing transistor, a threshold compensation transistor, a first reset transistor, a bias transistor, and a light-emitting control module; and a light-emitting element. The data writing transistor is electrically connected to a first terminal of the driving transistor. The threshold compensation transistor is connected in series between a gate of the driving transistor and a second terminal of the driving transistor, and configured to detect and self-compensate a threshold voltage deviation of the driving transistor. The first reset transistor is electrically connected to the second terminal of the driving transistor. The bias transistor is electrically connected to the second terminal of the driving transistor. The light-emitting control module is respectively connected in series with the driving transistor and the light-emitting element to control whether a driving current flows through the light-emitting element. The first reset transistor and the bias transistor have the same transistor type.

Another aspect of the present disclosure provides a display panel driving method. The method includes a display panel, the display panel including a pixel circuit and a light-emitting element, the pixel circuit including a driving transistor, a data writing transistor, a threshold compensation transistor, a first reset transistor, a bias transistor, and a light-emitting control module, a working process of the pixel circuit including a first bias stage, a reset stage, a data writing stage, and a light-emitting stage. The method includes turning on the bias transistor to provide a bias voltage to a second terminal of the driving transistor in the first bias stage; turning on the first reset transistor and the threshold compensation transistor to provide a first reference voltage to a gate of the driving transistor in the reset stage; turning on the data writing transistor and the threshold compensation transistor to provide a data signal to the gate of the driving transistor in the data writing stage; and turning on the light-emitting control module to control a driving current to flow through the light-emitting element in the light-emitting stage.

Compared with the existing technology, the bias transistor in the pixel circuit in the display panel provided by the embodiments of the present disclosure can be used to bias the second terminal of the driving transistor to address the threshold shift of the driving transistor. The gate of the driving transistor can be reset through the first reset transistor. That is, the bias transistor in the pixel circuit only needs to receive a signal that can bias the second terminal of the driving transistor. The received signal for biasing the second terminal of the driving transistor can be a fixed signal, such that there is no need to set an independent shift register circuit to control the signal. Further, since the transistor type of the data writing transistor in the pixel circuit can be the same as the transistor type of the first reset transistor, the control of the data writing transistor and the first reset transistor can be realized through a set of shift register circuit, thereby reducing the number of shift register circuits, which is beneficial in realizing the narrow frame design of the display panel, and the performance of the driving transistor can be ensured, thereby ensuring the display effect of the display panel.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
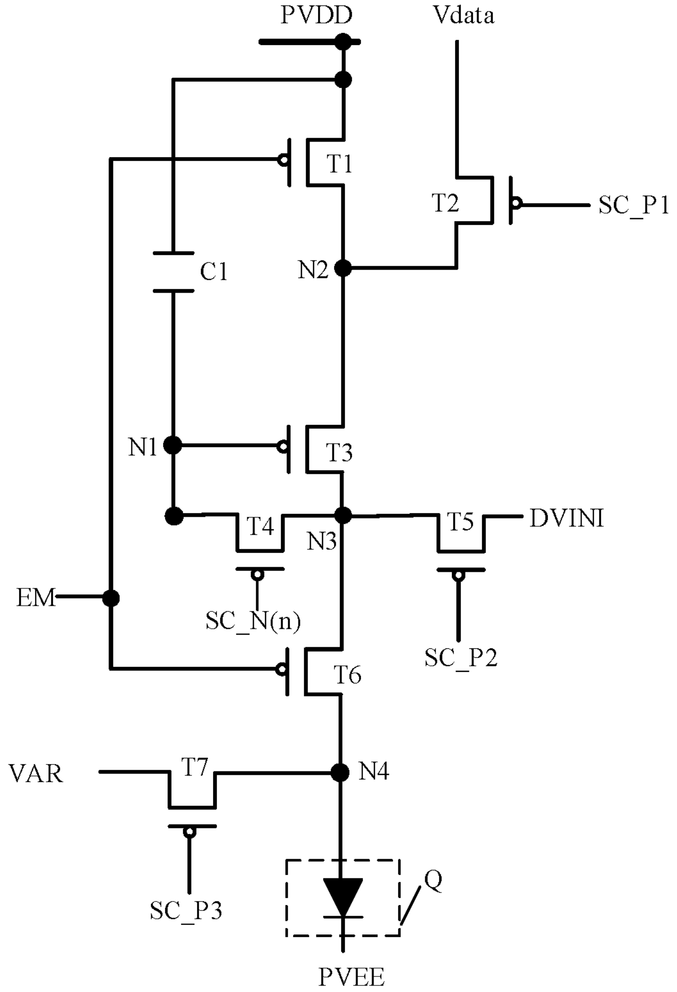
FIG. 1 (Prior Art)
FIG. 1 is a schematic structural diagram of a pixel circuit in related art.

FIG. 1 is a schematic structural diagram of a pixel circuit in related art. In existing technology, if the driving transistor T3 is in the same bias state for an extended period of time, the driving transistor T3 is prone to threshold shift, which will affect the generated driving current, thereby affecting the light-emitting effect of the display panel. In order to reduce the threshold shift, in existing technology, the control of the driving transistor T3 is realized by controlling the transistor T5 in FIG. 1 to receive different signals at different working stages of the pixel circuit to reduce the threshold shift of the driving transistor T3, thereby improving the display effect of the display panel.

In order to enable the transistor T5 to receive different signals in different working stages of the pixel circuit, a set of independent shift register circuits need to be added to provide the input signal DVINI for the transistor T5. This leads to a large number of shift register circuits located in the border area of the display panel, which is not beneficial to the narrow frame design of the display panel.

Embodiments of the present disclosure provide a display panel with an improved pixel circuit, which can avoid the threshold shift of the driving transistor, and reduce the number of shift register circuits in the border area of the display panel, thereby realizing the narrow frame design of the display panel.

In order to make the objectives, technical solutions, and advantages of the present disclosure more clear, the technical solutions in the embodiments of the present disclosure will be described below with reference to the drawings.

Figure 2:
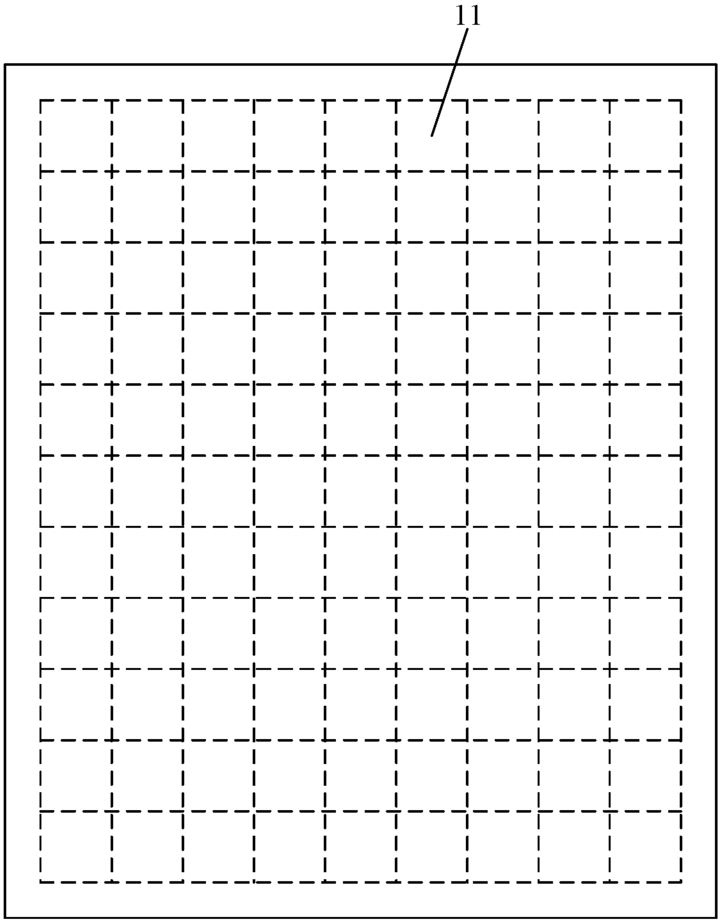
FIG. 2 is a schematic structural diagram of a display panel according to an embodiment of the present disclosure.

FIG. 2 is a schematic structural diagram of a display panel according to an embodiment of the present disclosure. The display panel includes a plurality of pixels 11. In order to realize full-color display of the display panel, in some embodiments, the plurality of pixels 11 may include pixels for emitting green light, pixels for emitting blue light, and pixels for emitting red light.

Figure 3:
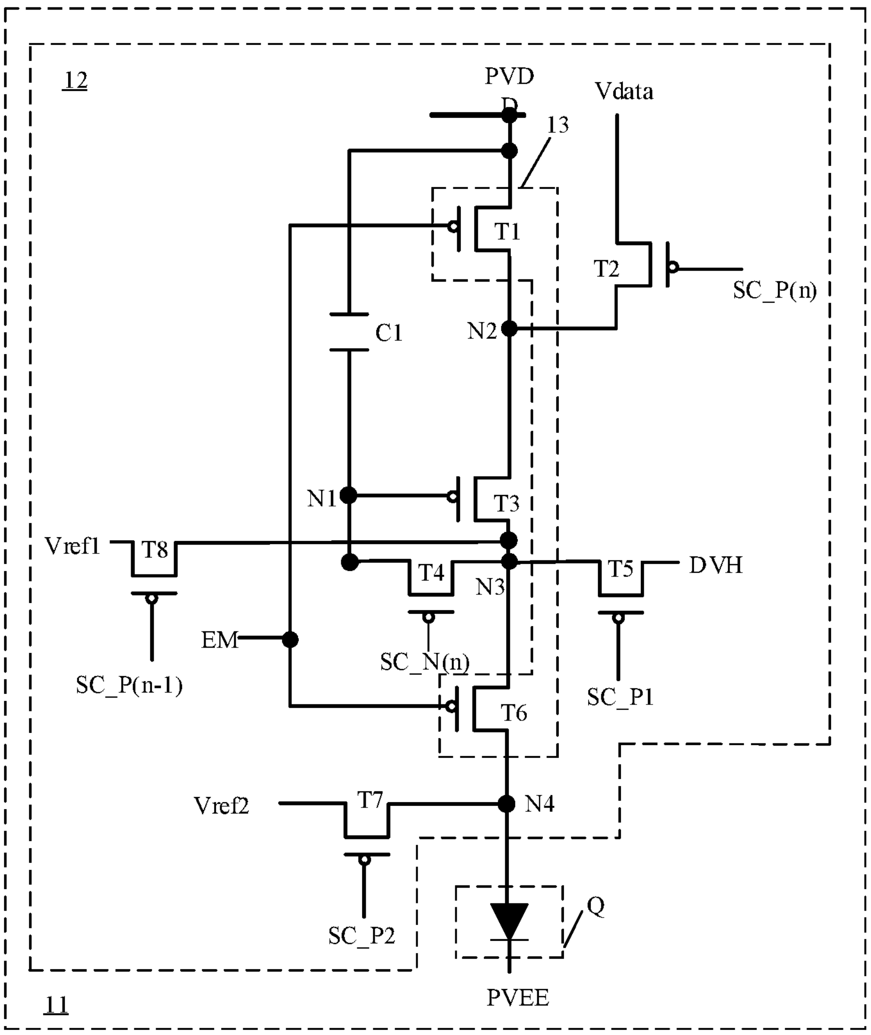
FIG. 3 is a schematic structural diagram of a pixel according to an embodiment of the present disclosure.

FIG. 3 is a schematic structural diagram of a pixel according to an embodiment of the present disclosure. The pixel includes a light-emitting element Q, and a pixel circuit 12 electrically connected to the light-emitting element Q. The pixel circuit 12 includes a driving transistor T3, a data writing transistor T2, a threshold compensation transistor T4, a first reset transistor T8, a bias transistor T5, and a light-emitting control module 13.

As shown in FIG. 3, the data writing transistor T2 is electrically connected to a first terminal of the driving transistor T3.

The threshold compensation transistor T4 is connected in series between a gate of the driving transistor T3 and a second terminal of the driving transistor T3. The threshold compensation transistor T4 may be configured to detect and self-compensate the deviation of the threshold voltage of the driving transistor T3.

The first reset transistor T8 is electrically connected to the second terminal of the driving transistor T3.

The bias transistor T5 is electrically connected to the second terminal of the driving transistor T3.

The light-emitting control module 13 is connected in series with the driving transistor T3 and the light-emitting element Q, respectively. The light-emitting control module 13 may be configured to control whether the driving current flows through the light-emitting element Q.

In some embodiments, the transistor type of the data writing transistor T2 may be the same as the transistor type of the first reset transistor T8.

More specifically, in the embodiments of the present disclosure, the data writing transistor T2 may write the data signal $V_{data}$ to the driving transistor T3. The driving transistor T3 may generate a driving current based on the data signal $V_{data}$, and the light-emitting control module 13 may control whether the driving current flows through the light-emitting element Q, thereby controlling the display state of the light-emitting element Q.

As shown in FIG. 3, in the pixel circuit 12, the bias transistor T5 is used to bias the second terminal of the driving transistor T3, thereby avoiding the threshold shift of the driving transistor T3. The gate of the driving transistor T3 is reset through the first reset transistor T8. That is, the bias transistor T5 in the pixel circuit 12 may only need to receive a signal that can bias the second terminal of the driving transistor T3. The received signal for biasing the second terminal of the driving transistor T3 may be a fixed signal, and there may be no need to set an independent shift register circuit to provide the biasing signal to the bias transistor T5. It should be noted that, in the embodiments of the present disclosure, the fixed signal may be an existing high-level signal DVH in the display panel, and the high-level signal may be a signal with a constant voltage.

Further, the transistor type of the data writing transistor T2 in the pixel circuit 12 may be the same as the transistor type of the first reset transistor T8. For example, the data writing transistor T2 and the first reset transistor T8 may both be P-type transistors, and the enable level that controls the conduction of the data writing transistor T2 and the enable level that controls the conduction of the first reset transistor T8 may both be low levels. Or, the data writing transistor T2 and the first reset transistor T8 may both be N-type transistors, and the enable level that controls the conduction of the data writing transistor T2 and the enable level that controls the conduction of the first reset transistor T8 may both be high levels. The first reset transistor T8 and the data writing transistor T2 of the pixel circuit 12 may be turned on in a time division, and the signals provided by the adjacent two-stage shift registers in the same group of shift register circuits may be used to control the first reset transistor T8 and the data writing transistor T2 respectively. The control of the data writing transistor T2 and the first reset transistor T8 can be realized simultaneously through one group of shift register circuits to reduce the number of shift register circuits, thereby realizing a narrow frame design of the display panel, and ensuring the performance of the driving transistor T3 to ensure the display effect of the display panel.

Figure 4:
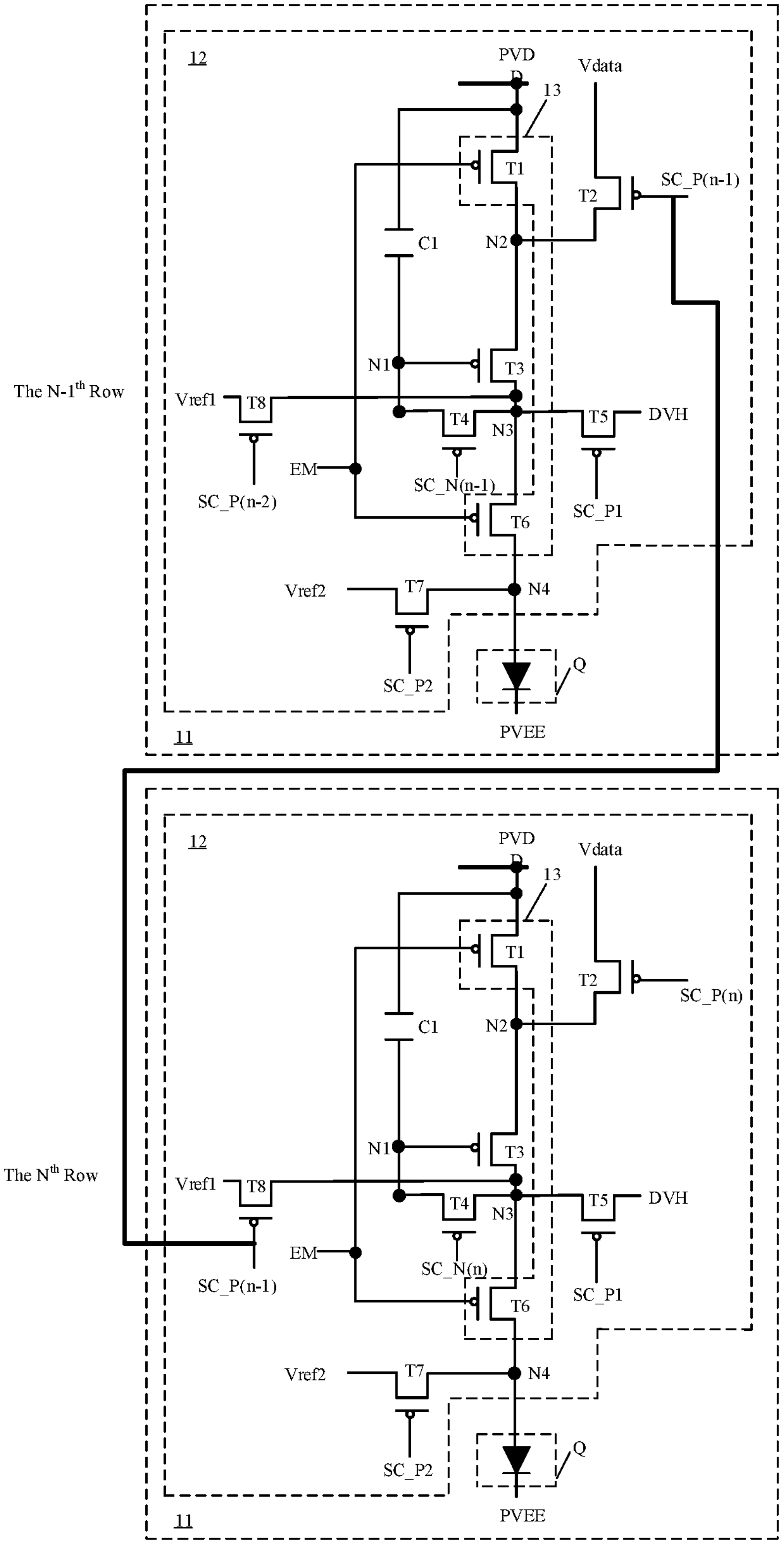
FIG. 4 is a schematic structural diagram of another pixel according to an embodiment of the present disclosure.

FIG. 4 is a schematic structural diagram of another pixel according to an embodiment of the present disclosure. As shown in FIG. 4, the gate of the data writing transistor T2 is electrically connected to a first scan signal terminal SC_P (n), and the gate of the first reset transistor T8 is electrically connected to a second scan signal terminal SC_P(n−1).

For pixel circuits 12 located in adjacent rows, the signal of the second scan signal terminal SC_P(n−1) that is electrically connected to the gate of first reset transistor T8 of the pixel circuit 12 in the current row (e.g., the $n^{th}$ row) may be the same as the signal of the first scan signal terminal SC_P(n) that is electrically connected to the gate of the data writing transistor T2 of the pixel circuit 12 in the previous row (e.g., the $n-1^{th}$ row)

More specifically, in the embodiments of the present disclosure, the gate of the data writing transistor T2 may be electrically connected to the first scan signal terminal SC_P (n). The first scan signal terminal SC_P(n) may be used for outputting a first control signal for controlling the data writing transistor T2. The first control signal may be a pulse signal. A valid pulse of the first control signal may control the data writing transistor T2 to be in an on state to write the data signal $V_{data}$ to the first terminal (the second terminal N2) of the driving transistor T3, and an invalid pulse of the first control signal may control the data writing transistor T2 to be in an off state. That is, under the control of the first control signal, the data writing transistor T2 may provide the data signal $V_{data}$ to the first terminal of the driving transistor T3.

It should be noted that the data writing transistor T2 may cooperate with the threshold compensation transistor T4 to write the data signal $V_{data}$ to the gate of the driving transistor T3. At this time, both the data writing transistor T2 and the threshold compensation transistor T4 may be in the on state.

The gate of the first reset transistor T8 may be electrically connected to the second scan signal terminal SC_P(n−1), and the second scan signal terminal SC_P(n−1) may be used for outputting a second control signal for controlling the first reset transistor T8. The second control signal may be a pulse signal. A valid pulse of the second control signal may control the first reset transistor T8 to be in an on state, and provide the reference voltage to the second terminal of the driving transistor T3, and an invalid pulse of the second control signal may control the first reset transistor T8 to be in an off state.

It should be noted that the first reset transistor T8 may cooperate with the threshold compensation transistor T4 to reset the gate of the driving transistor T3. At this time, both the first reset transistor T8 and the threshold compensation transistor T4 may be in an on state.

The display panel may include a plurality of shift register circuits. One shift register circuit may include multi-stage shift registers arranged in cascade, and each stage of the shift registers may be set to correspond to a pixel circuit row. For example, the nth shift register may provide the control signal for the nth row of the pixel circuits. The signal provided by the second scan signal terminal SC_P(n−1) to which the gate of the first reset transistor T8 of the pixel circuit 12 is electrically connected may be provided by the n−1th shift register in the cascaded shift registers, that is, the control signal provided by the shift register corresponding to the pixel circuit of the n−1th can be borrowed. The signal provided by the first scan signal terminal SC_P(n) to which the gate of the data writing transistor T2 is electrically connected may be provided by the n−1th shift register in the cascaded shift registers. The transistor type of the data writing transistor T2 in the pixel circuit 12 may be the same as the transistor type of the first reset transistor T8 in the pixel circuit 12. The signal provided by the second scan signal terminal SC_P(n−1) to which the gate of the first reset transistor T8 in the pixel circuit of the nth row is electrically connected and the signal provided by the first scan signal terminal SC_P(n) to which the gate of the data writing transistor T2 in the pixel circuit of the $n-1^{th}$ row is electrically connected may be provided by the same stage shift register (such as the n−1 stage). That is, the same shift register may provide the control signals to the data writing transistor T2 and the first reset transistor T8 in the pixel circuit. Therefore, in the display panel provided by the embodiments of the present disclosure, the number of shift register circuits in the frame area of the display panel can be reduced by improving the pixel circuit 12, thereby realizing the narrow frame design of the display panel.

Refer to FIG. 3. The gate of the bias transistor T5 is electrically connected to a third scan signal terminal SC_P1. The pixel circuit 12 further includes a second reset transistor T7. The second reset transistor T7 is electrically connected to a second reference voltage Vref2, and the second terminal of the second reset transistor T7 is electrically connected to the light-emitting element Q, and both are electrically connected a fourth node N4. The gate of the second reset transistor T7 is electrically connected to a fourth scan signal terminal SC_P2. The signals provided by the third scan signal terminal SC_P1 and the fourth scan signal terminal SC_P2 connected to the same pixel circuit 12 may be the same signal. For example, the same scan signal line may be used to provide signals to the third scan signal terminal SC_P1 and the fourth scan signal terminal SC_P2 respectively.

More specifically, in the embodiments of the present disclosure, the gate of the bias transistor T5 may be electrically connected to the third scan signal terminal SC_P1, and the gate of the second reset transistor T7 may be electrically connected to the fourth scan signal terminal SC_P2. The third scan signal terminal SC_P1 may be used for outputting a signal for controlling the bias transistor T5, and the fourth scan signal terminal SC_P2 may be used for outputting a signal for controlling the second reset transistor T7, and both signals may be a third control signal. The third control signal may be a pulse signal. A valid pulse of the third control signal may control the bias transistor T5 to be in an on state to bias the second terminal of the driving transistor T3, and control the second reset transistor T7 to be in an on state to bias the anode of the light-emitting element Q to perform a reset. An invalid pulse of the third control signal may control the bias transistor T5 and the second reset transistor T7 to be in an off state.

In the embodiments of the present disclosure, the same signal may be used to control on and off states of the bias transistor T5 and the second reset transistor T7, and the same shift register of the shift register circuit may be used to provide the control signal for the bias transistor T5 and the second reset transistor T7, thereby reducing the number of shift register circuits provided for each transistor.

Figure 5:
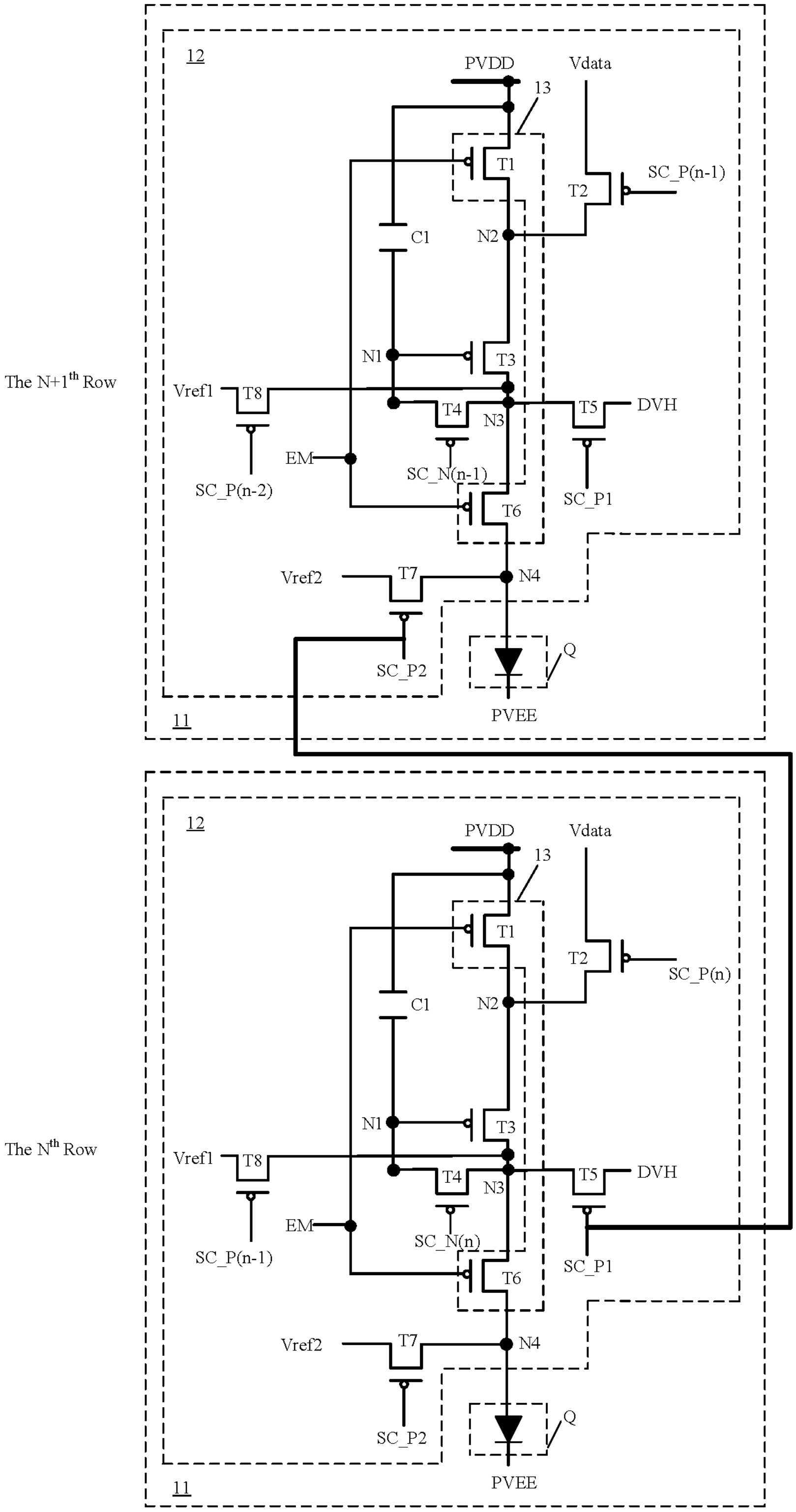
FIG. 5 is a schematic structural diagram of another pixel according to an embodiment of the present disclosure.

FIG. 5 is a schematic structural diagram of another pixel according to an embodiment of the present disclosure. As shown in FIG. 5, the gate of the data writing transistor T2 is electrically connected to the third scan signal terminal SC_P1. The pixel circuit 12 further includes a second reset transistor T7. The first terminal of the second reset transistor T7 is electrically connected to the second reference voltage Vref2, the second terminal of the second reset transistor T7 is electrically connected to the light-emitting element Q, and the gate of the second reset transistor T7 is electrically connected to the fourth scan signal terminal SC_P2.

For pixel circuits located in two adjacent groups, the signal of the third scan signal terminal SC_P1 to which the gate of the bias transistor T5 of the pixel circuit 12 of the current group is electrically connected may be the same as the signal of the fourth scan signal terminal SC_P2 to which the gate of the second reset transistor T7 of the pixel circuit 12 of the previous group is electrically connected, where a group may include two adjacent rows of pixel circuits 12.

More specifically, in the embodiments of the present disclosure, since the display panel includes a plurality of pixels 11 arranged in an array, each pixel 11 may include a light-emitting element Q and the pixel circuit 12 may be electrically connected to the light-emitting element Q. In each driving cycle, the driving of the pixel circuit 12 in each row may be realized in a row-by-row scanning manner. As shown in FIG. 5, in order to reduce the number of signal lines in the display panel, the third scan signal terminal SC_P1 in the pixel circuit 12 of the nth pixel row may be set to be electrically connected to the fourth scan signal terminal SC_P2 of the pixel circuit 12 of the n−1th pixel row. When the pixel circuit 12 of the n−1th pixel row resets the anode of the light-emitting element Q, the biasing process performed by the pixel circuit 12 of the nth pixel row to the second terminal of the driving transistor T3 can be simultaneously realized, thereby improving the biasing effect on the driving transistor T3. In this way, the threshold shift of the driving transistor T3 can be avoided, and the stability of the driving current generated by the driving transistor T3 can be improved, thereby improving the display effect of the display panel.

The shift register circuit of the display panel may be set as a one-stage shift register corresponding to two rows of pixel circuits. For example, a one-stage shift register may be configured to provide signals for the third scan signal terminal SC_P1 of the bias transistors in the pixel circuits of two adjacent rows respectively. Two rows of pixel circuits corresponding to the same stage of shift register may form a group, and for pixel circuits located in two adjacent groups, the signal of the third scan signal terminal SC_P1 to which the gate of the bias transistor T5 of the pixel circuit located in the current group (e.g., the $n^t$h row and the $n+1^{th}$ row) is electrically connected to may be the same as the signal of the fourth scan signal terminal SC_P2 to which the gate of the second reset transistor T7 of the pixel circuit located in the previous group (e.g., the $n-2^{th}$ row and the $n-1^{th}$ row) is electrically connected to, and the signal may be provided by the same stage shift register.

In some embodiments, the active layer of the threshold compensation transistor T4 may include metal oxide.

More specifically, in the embodiments of the present disclosure, the threshold compensation transistor T4 may be a metal oxide transistor with low leakage current level. That is, the active layer of the threshold compensation transistor T4 may use metal oxide, which can keep the gate of the driving transistor T3 at a stable potential in the light-emitting stage, thereby avoiding the brightness reduction in the light-emitting stage caused by the current leakage of the threshold compensation transistor T4.

In some embodiments, the active layer of the threshold compensation transistor T4 may be indium gallium zinc oxide (IGZO).

The IGZO is composed of $In_2O_3$, $Ga_2O_3$, and ZnO, and the forbidden band width is approximately 3.5 eV, which is an N-type semiconductor material. That is, in the embodiments of the present disclosure, the threshold compensation transistor T4 is an N-type transistor as an example for description.

Based on the low leakage characteristics of the threshold compensation transistor T4, the data writing transistor T2 and the first reset transistor T8 may be low temperature poly silicon (LTPS) transistors, which does not affect the stability of the data writing transistor T2 writing the data signal $V_{data}$ to the gate of the driving transistor T3, nor does it affect the reset effect of the first reset transistor T8 for resetting the gate of the driving transistor T3, and the current leakage of the first reset transistor T8 will not affect the gate potential of the driving transistor T3.

In the embodiments of the present disclosure, the driving transistor T3, the data writing transistor T2, the bias transistor T5, the first reset transistor T8, the second reset transistor T7, and the active layers of the transistors in the light-emitting control module 13 may include polysilicon materials.

As shown in FIG. 3 to FIG. 5, the pixel circuit further includes the second reset transistor T7. The gate of the driving transistor T3 is electrically connected to the first node N1, the terminal of the driving transistor T3 is electrically connected to the second node N2, and the second terminal of the driving transistor T3 is electrically connected to the third node N3. The gate of the data writing transistor T2 is electrically connected to the first scan signal terminal SC_P (n), the first terminal of the data writing transistor T2 is electrically connected to the data signal Vdata, and the second terminal of the data writing transistor T2 is electrically connected the second node N2. The gate of the first reset transistor T8 is electrically connected to the second scan signal terminal SC_P (n−1), the first terminal of the first reset transistor T8 is electrically connected to the first reference voltage terminal Vref1, and the second terminal of the first reset transistor T8 is electrically connected to the third node N3. The gate of the bias transistor T5 is electrically connected to the third scan signal terminal SC_P1, the first terminal of the bias transistor T5 is electrically connected to the bias voltage terminal DVH, and the second terminal of the bias transistor T5 is electrically connected to the third node N3. The gate of the threshold compensation transistor T4 is electrically connected to a fifth scan signal terminal SC_N (n), the first terminal of the threshold compensation transistor T4 is electrically connected to the third node N3, and the second terminal of the threshold compensation transistor T4 is electrically connected to the first node N1. The gate of the second reset transistor T7 is electrically connected to the fourth scan signal terminal SC_P2, the first terminal of the second reset transistor T7 is electrically connected to the second reference voltage terminal Vref2, and the second terminal of the second reset transistor T7 is electrically connected to the fourth node N4.

The light-emitting control module 13 may include a first light-emitting control transistor T1 and a second light-emitting control transistor T6. The first light-emitting control transistor T1 may be electrically connected to the second node N2, the first terminal of the second light- emitting control transistor T6 may be electrically connected to the third node N3, and the second terminal of the second light-emitting control transistor T6 may be electrically connected to the third node N4. The gate of the first light-emitting control transistor Tl and the gate of the second light-emitting control transistor T6 may both be electrically connected to a light-emitting control signal terminal EM.

In some embodiments, the light-emitting element Q may be electrically connected to the fourth node N4.

More specifically, in the embodiments of the present disclosure, the gate of the data writing transistor T2 may be electrically connected to the first scan signal terminal SC_P (n), the first terminal of the data writing transistor T2 may be electrically connected to the data signal $V_{data}$, and the second terminal of the data writing transistor T2 may be electrically connected the second node N2. The data signal terminal Vdata may be used for outputting the data signal $V_{data}$. The first scan signal terminal SC_P(n) may be used for outputting a first control signal for controlling the data writing transistor T2. The first control signal may be a pulse signal. A valid pulse of the first control signal may control the data writing transistor T2 to be in an on state to write the data signal $V_{data}$ to the gate of the driving transistor T3. An invalid pulse of the first control signal may control the data writing transistor T2 to be in an off state. Therefore, under the control of the first control signal, the data writing transistor T2 may selectively write the data signal $V_{data}$ required by the pixel.

The gate of the first reset transistor T8 may be electrically connected to the second scan signal terminal SC_P(n−1), the first terminal of the first reset transistor T8 may be electrically connected to the first reference voltage terminal Vref1, and the second terminal of the first reset transistor T8 may be electrically connected to the third node N3. The first reference voltage terminal Vref1 may be used for outputting a first reset signal for resetting the gate of the driving transistor T3. The second scan signal terminal SC_P(n−1) may be used for outputting a second control signal for controlling the first reset transistor T8. The second control signal may be a pulse signal. A valid pulse of the second control signal may control the first reset transistor T8 to be in an on state to reset the gate of the driving transistor T3. An invalid pulse of the second control signal may control the first reset transistor T8 to be in an off state.

The gate of the bias transistor T5 may be electrically connected to the third scan signal terminal SC_P1, the first terminal of the bias transistor T5 may be electrically connected to the bias voltage terminal DVH, and the second terminal of the bias transistor T5 may be electrically connected to the third node N3. The bias voltage terminal DVH may be used for outputting a bias signal for biasing the second terminal of the driving transistor T3. The third scan signal terminal SC_P1 may be used for outputting a third control signal for controlling the bias transistor T5. The third control signal may be a pulse signal. A valid pulse of the third control signal may control the bias transistor T5 to be in an on state to bias the second terminal of the driving transistor T3. An invalid pulse of the third control signal may control the bias transistor T5 to be in an off state.

The gate of the second reset transistor T7 may be electrically connected to the fourth scan signal terminal SC_P2, the first terminal of the second reset transistor T7 may be electrically connected to the second reference voltage terminal Vref2, and the second terminal of the second reset transistor T7 may be electrically connected to the fourth node N4. The second reference voltage terminal Vref2 may be used for outputting a second reset signal for resetting the anode of the light-emitting element Q. The fourth scan signal terminal SC_P2 may be used for outputting a fourth control signal for controlling the second reset transistor T7. The fourth control signal may be a pulse signal. A valid pulse of the fourth control signal may control the second reset transistor T7 to be in an on state to reset the anode of the light-emitting element Q. An invalid pulse of the fourth control signal may control the second reset transistor T7 to be in an off state.

The gate of the threshold compensation transistor T4 may be electrically connected to a fifth scan signal terminal SC_N(n), the first terminal of the threshold compensation transistor T4 may be electrically connected to the third node N3, and the second terminal of the threshold compensation transistor T4 may be electrically connected to the first node N1. The fifth scan signal terminal SC_N(n) may be used for outputting a fifth control signal for controlling the threshold compensation transistor T4. The fifth scan signal terminal SC_N(n) may be a pulse signal. A valid pulse of the fifth control signal may control the threshold compensation transistor T4 to be in an on state to detect and self-compensate for the deviation of the threshold value voltage of the driving transistor T3. An invalid pulse of the fifth control signal may control the threshold compensation transistor T4 to be in an off state.

The first light-emitting control transistor T1 may be electrically connected to the second node N2, the first terminal of the second light-emitting control transistor T6 may be electrically connected to the third node N3, and the second terminal of the second light-emitting control transistor T6 may be electrically connected to the third node N4. The gate of the first light-emitting control transistor T1 and the gate of the second light-emitting control transistor T6 may both be electrically connected the light-emitting control signal terminal EM. The light-emitting control signal terminal EM may be used for outputting a light-emitting control signal for controlling the first light-emitting control transistor T1 and the second light-emitting control transistor T6. The light-emitting control signal may be a pulse signal. A valid pulse of the light-emitting control signal may control the first light-emitting control transistor T1 and the second light-emitting control transistor T6. At this time, the driving current may flow through the light-emitting element Q, and the light-emitting element Q may emit light in response to the driving current. An invalid pulse of the light-emitting control signal may control the first light-emitting control transistor T1 and the second light-emitting control transistor T6 to be in an off state.

It should be noted that the first terminal of the first light-emitting control transistor T1 may be electrically connected to a first power supply voltage terminal PVDD, and the second terminal of the first light-emitting control transistor T1 may be electrically connected to the second node N2. The anode of the light-emitting element Q may be electrically connected to the fourth node N4, and the cathode of the light-emitting element Q may be electrically connected to a second power supply voltage terminal PVEE.

It should be noted that the data writing transistor T2 may write the data signal $V_{data}$ to the gate of the driving transistor T3. At this time, both the data writing transistor T2 and the threshold compensation transistor T4 may be in the on state. When the first reset transistor T8 resets the gate of the driving transistor T3, the first reset transistor T8 and the threshold compensation transistor T4 may both be in the on state.

In some embodiments, the pixel circuit 12 further includes a capacitor C1. The first plate of the capacitor C1 may be electrically connected to the first power supply voltage terminal PVDD, and the second plate of the capacitor C1 may be electrically connected to the first node N1.

Figure 6:
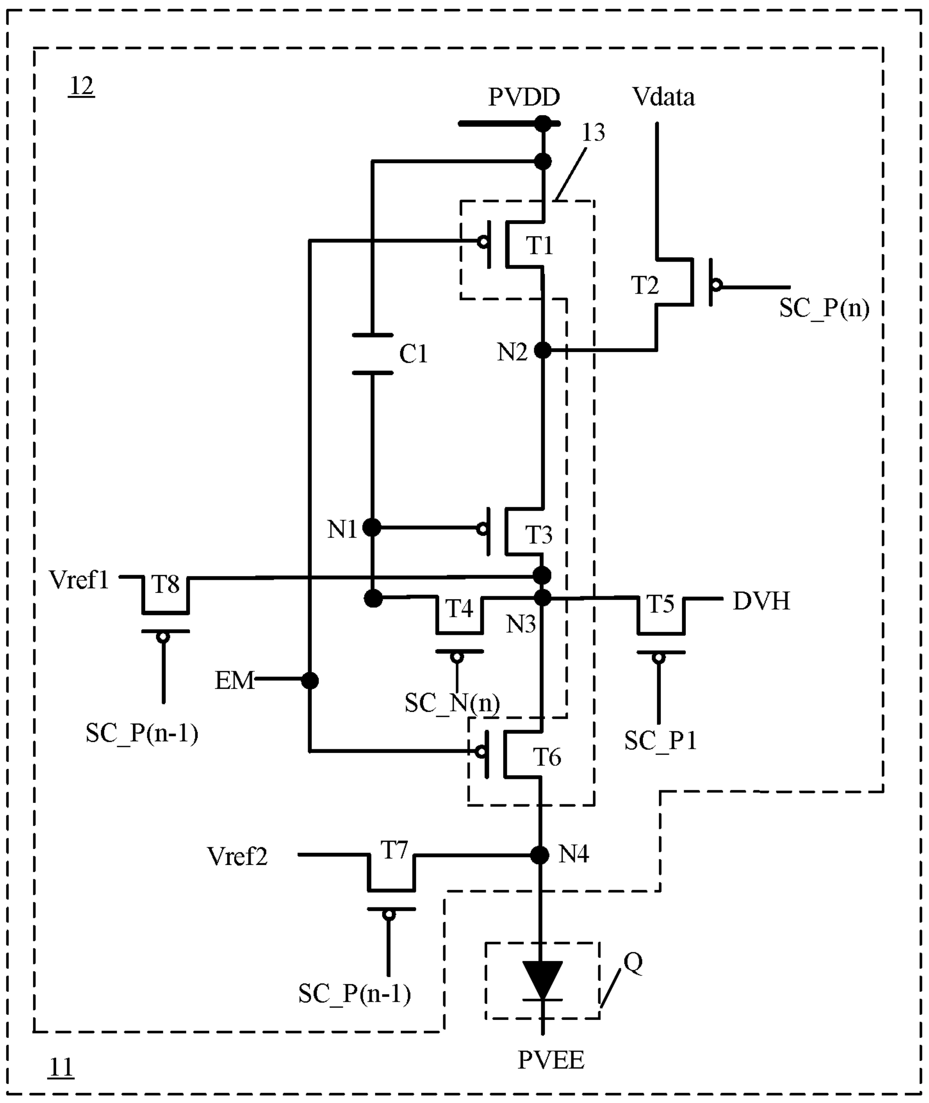
FIG. 6 is a schematic structural diagram of another pixel according to an embodiment of the present disclosure.

FIG. 6 is a schematic structural diagram of another pixel according to an embodiment of the present disclosure. As shown in FIG. 6, the control signal SC_P(n−1) of the first reset transistor T8 and the control signal SC_P(n−1) of the second reset transistor T7 are the same.

More specifically, in the embodiments of the present disclosure, the first reset transistor T8 may be used to reset the gate of the driving transistor T3, and the second reset transistor T7 may be used to reset the anode of the light-emitting element Q. In the embodiments of the present disclosure, the control signal of the first reset transistor T8 and the control signal of the second reset transistor T7 can be the same, and the same group of shift register circuits can be used to control the first reset transistor T8 and the second reset transistor T7, thereby simplifying the number of wirings on the display panel.

In other words, the gate of the first reset transistor T8 and the gate of the second reset transistor T7 may be connected to the same scan signal terminal. The embodiments of the present disclosure take the gate of the first reset transistor T8 and the gate of the second reset transistor T7 being jointly connected to the second scan signal terminal SC_P(n−1) as an example for illustration.

Figure 7:
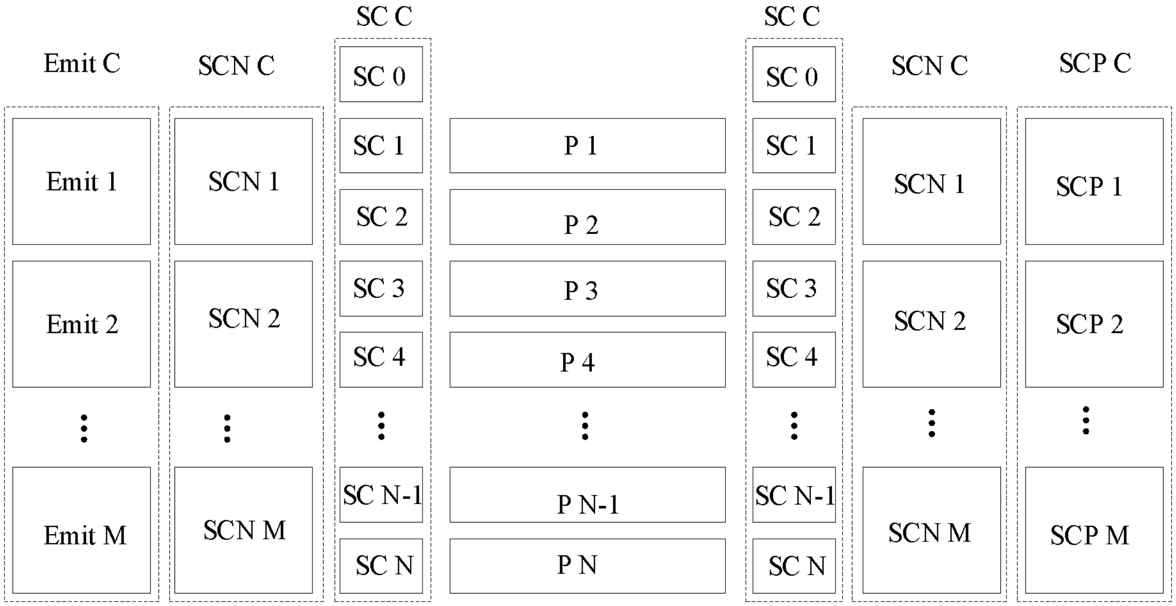
FIG. 7 is a schematic diagram of the display panel according to an embodiment of the present disclosure.

FIG. 7 is schematic diagram of the display panel according to an embodiment of the present disclosure. As shown in FIG. 7, the display panel includes N rows of pixel circuits. Further, in the first row of the pixel circuits P1 to the $N^{th}$ row of pixel circuits PN, the display panel further includes a first scan circuit SC C, a second scan circuit SCN C, a third scan circuit SCP C, and a light emission control circuit Emit C. The first scan circuit SC C, the second scan circuit SCN C, the third scan circuit SCP C, and the light emission control circuit Emit C all include multi-stage cascaded shift registers. The first scan circuit SC C includes N+1 stages of shift registers, which are SC 0 to SC N respectively. Each stage of the shift registers may be set to correspond to a row of pixel circuits. The second scan circuit SCN C includes M stages of FIG. 7 is a schematic diagram of the display panel according to an embodiment of the present disclosure. As shown in FIG. 7, the display panel includes N rows of pixel circuits. Further, in the first row of the pixel circuits P1 to the Nth row of pixel circuits PN, the display panel further includes a first scan circuit SC C, a second scan circuit SCN C, a third scan circuit SCP C, and a light emission control circuit Emit C. The first scan circuit SC C, the second scan circuit SCN C, the third scan circuit SCP C, and the light emission control circuit Emit C all include multi-stage cascaded shift registers. The first scan circuit SC C includes N+1 stages of shift registers, which are SC 0 to SC N respectively. Each stage of the shift registers may be set to correspond to a row of pixel circuits. The second scan circuit SCN C includes M stages of shift registers, which are SCN 1 to SCN M respectively. Each stage of the shift registers may be set to correspond to two rows of pixel circuits. The third scan circuit SCP C includes M stages of shift registers, which are SCP 1 to SCP M respectively. Each stage of the shift registers may be set to correspond to two rows of pixel circuits. The light emission control circuit Emit C includes M stages of shift registers, which are Emit 1 to Emit M respectively. Each stage of the shift registers may be set to correspond to two rows of pixel circuits. In some embodiments, M may be half of N.

The arrangement of each stage of the shift registers corresponding to one row of pixel circuits enables each stage of the shift registers to only provide signals to the transistors with the same function in one row, and does not provide signals to the transistors with the same function in other rows. The arrangement of each stage of the shift registers corresponding to two rows of pixel circuits enables each stage of the shift registers to provide the same signals to the transistors with the same function in two rows, but does not provide signals to the transistors with the same function in other rows.

In FIG. 7, the first scan circuit SC C and the second scan circuit SCN C are bilaterally driven. That is, two sets of circuits are respectively arranged at opposite ends of the pixel circuit row. The third scan circuit SCP C and the light emission control circuit Emit C are unilaterally driven. That is, the third scan circuit SCP C and the light emission control circuit Emit C are respectively disposed at one terminal of the pixel circuit row.

In some embodiments, the control signal of the data writing transistor T2 and the control signal of the first reset transistor T8 may be provided by the first scan circuit SC C, the control signal of the threshold compensation transistor T4 may be provided by the second scan circuit SCN C, and the control signal of the bias transistor T5 may be provided by the third scan circuit SCP C.

In some embodiments, the light-emitting control module 13 may include a first light-emitting control transistor T1 and a second light-emitting control transistor T6. The control signals of the first light-emitting control transistor T1 and the second light-emitting control transistor T6 may be provided by the light emission control circuit Emit C.

More specifically, in the embodiments of the present disclosure, the first control signal for controlling the data writing transistor T2 and the second control signal for controlling the first reset transistor T8 may be provided by the first scan circuit SC C; the third control signal for controlling the bias transistor T5 may be provided by the second scan circuit SCN C; the fourth control signal for controlling the threshold compensation transistor T4 may be provided by the third scan circuit SCP C; and the light-emitting control signal for controlling the first light-emitting control transistor T1 and the second light-emitting control transistor T6 may be provided by the light emission control circuit Emit C.

In some embodiments, the shift registers included in the first scan circuit may be the first shift registers. A stage (e.g., a first stage or a current stage) of the shift register may provide the control signals for the data writing transistor T2 of the pixel circuit 12 in the current and provide the control signals for the first reset transistor T8 of the pixel circuit 12 in the next row. That is, the gate of the driving transistor T3 in the pixel circuit 12 of the next may be reset while the data signal $V_{data}$ is written in the pixel circuit 12 of the current row to fully reset the driving transistor T3 in the pixel circuit 12 of the next row to improve the reset effect of the gate of the driving transistor T3 in the pixel circuit 12 of the next row, thereby ensuring the signal stability of writing data signal $V_{data}$ to the gate of the driving transistor T3 by the pixel circuit 12 of the next row.

In some embodiments, the shift registers included in the second scan circuit may be the second shift registers. A stage (e.g., a first stage or a current stage) of the second shift register may provide the control signals for the threshold compensation transistor T4 of the pixel circuits located in the current two rows.

In some embodiments, the shift registers included in the third scan circuit may be the third shift registers. A stage (e.g., a first stage or a current stage) of the third shift register may provide the control signals for the bias transistor T5 of the pixel circuits located in the current two rows.

In some embodiments, the shift registers included in the light-emitting control circuit may be the fourth shift registers. A stage (e.g., a first stage or a current stage) of the fourth shift register may provide the control signals for the first light-emitting control transistor T1 and the second light-emitting control transistor T6 of the pixel circuits located in the current two rows.

Figure 8:
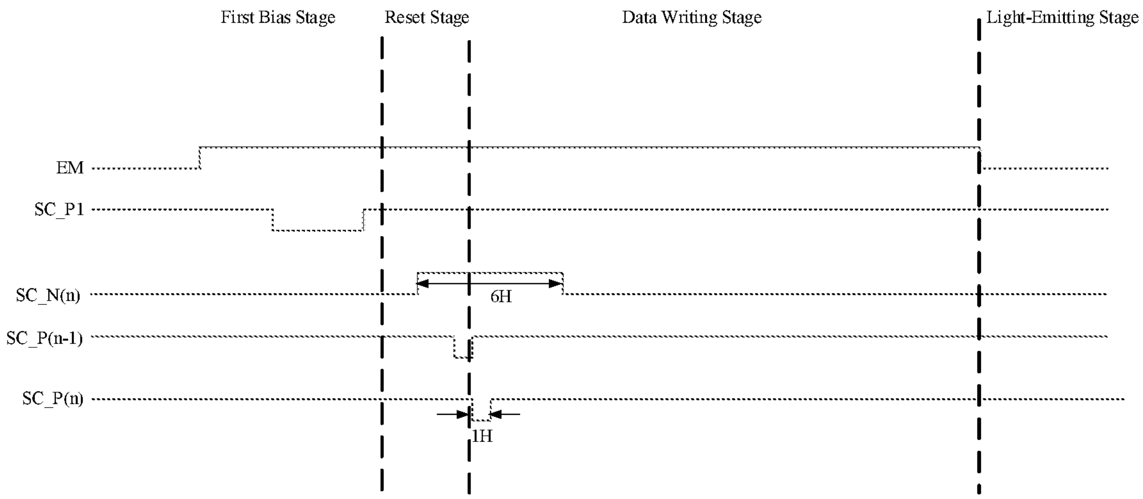
FIG. 8 is a timing diagram according to an embodiment of the present disclosure.

FIG. 8 is a timing diagram according to an embodiment of the present disclosure.

In some embodiments, the enable duration of the control signal provided by the first shift register may be 1H, and the enable duration of the control signal provided by the second shift register may be greater than or equal to 6H, where H represents the unit clock time.

More specifically, in the embodiments of the present disclosure, the enable duration of the control signal provided by the first shift register may be 1H. That is, the effect duration that data writing transistor T2 of the pixel circuit 12 of the current row and the first reset transistor T8 of the pixel circuit 12 of the next row are in the on state may be 1H. The enable duration of the control signal provided by the second shift register may be greater than or equal to 6H. That is, the effective duration when the threshold compensation transistor T4 is in the on state may be greater than or equal to 6H, which ensures that the gate of the driving transistor T3 can be reset, the data signal $V_{data}$ can be written, and the deviation of the threshold voltage of the driving transistor T3 can be detected and self-compensated. In addition, the first stage of the second shift register may be set to correspond to two rows of pixel circuits.

Figure 9:
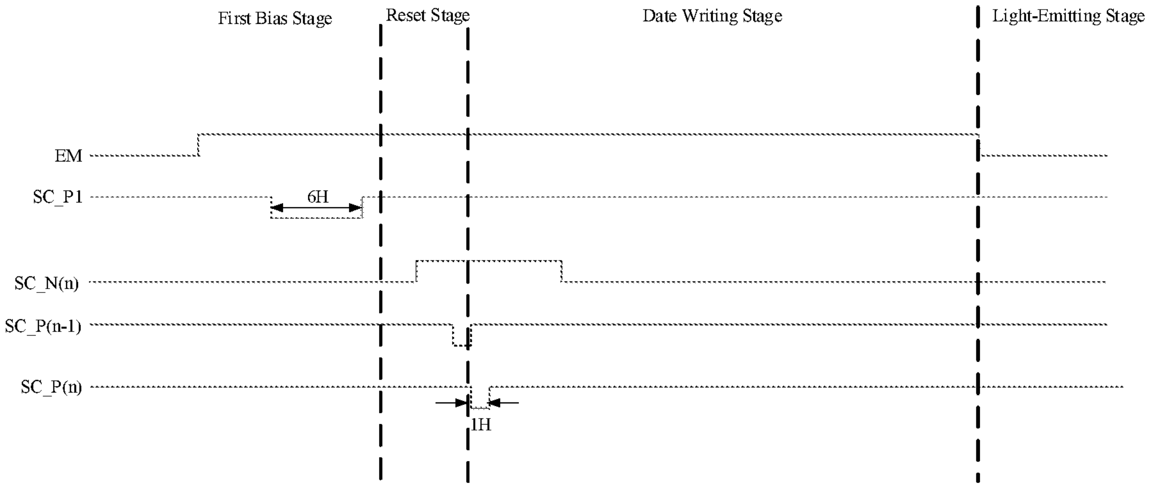
FIG. 9 is another timing diagram according to an embodiment of the present disclosure.

FIG. 9 is another timing diagram according to an embodiment of the present disclosure. In some embodiments, the enable duration of the control signal provided by the first shift register may be 1H, and the enable duration of the control signal provided by the third shift register may be greater than or equal to 6H, where H represents the unit clock time.

More specifically, in the embodiments of the present disclosure, the enable duration of the control signal provided by the first shift register may be 1H. That is, the effect duration that data writing transistor T2 of the pixel circuit 12 of the current row and the first reset transistor T8 of the pixel circuit 12 of the next row are in the on state may be 1H. The enable duration of the control signal provided by the third shift register may be greater than or equal to 6H. That is, the effective duration when the bias transistor T5 is in the on state may be greater than or equal to 6H to fully bias the second terminal of the bias transistor T5, thereby improving the biasing effect of the bias transistor T5 and reducing the threshold shift of the bias transistor T5. In this way, the stability of the driving current generated by the bias transistor T5 can be improved, thereby improving the display effect of the display panel.

Figure 10:
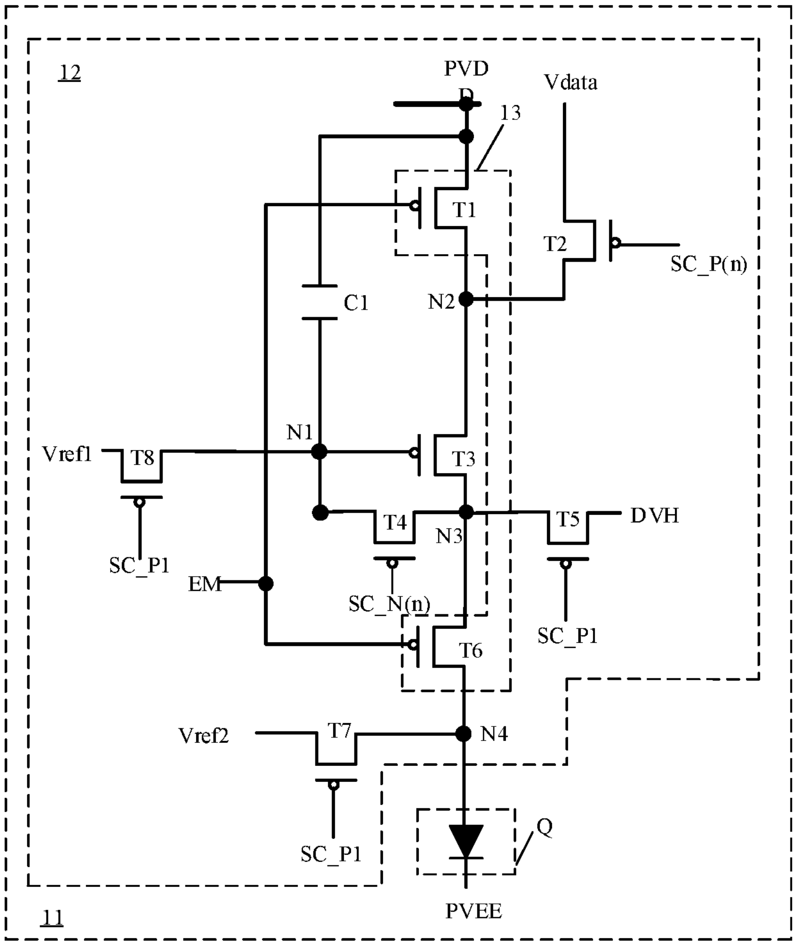
FIG. 10 is a schematic structural diagram of another pixel according to an embodiment of the present disclosure.

FIG. 10 is a schematic structural diagram of another pixel according to an embodiment of the present disclosure.

As shown in FIG. 10, the pixel 11 in the display panel includes a pixel circuit 12 and a light-emitting element Q. The pixel circuit 12 includes a driving transistor T3, a data writing transistor T2, a threshold compensation transistor T4, a first reset transistor T8, a bias transistor T5, and a light-emitting control module 13. The data writing transistor T2 is electrically connected to the first terminal of the driving transistor T3. The threshold compensation transistor T4 is connected in series between the gate of the driving transistor T3 and the second terminal of the driving transistor T3, and configured to detect and self-compensate the deviation of the threshold voltage of the driving transistor T3. The first reset transistor T8 is electrically connected to the gate of the driving transistor T3. The bias transistor T5 is electrically connected to the second terminal of the driving transistor T3. The light-emitting control module 13 is connected in series with the driving transistor T3 and the light-emitting element Q, respectively, for determining whether the driving current flows through the light-emitting element Q. In some embodiments, the transistor type of the first reset transistor T8 may be the same as the transistor type of the bias transistor T5.

More specifically, in the embodiments of the present disclosure, the first reset transistor T8 may be electrically connected to the gate of the driving transistor T3, and the transistor type of the first reset transistor T8 may be the same as the transistor type of the bias transistor T5. In this way, the control of the first reset transistor T8 and the bias transistor T5 may be realized at the same time through the same control signal. That is, the control signal of the first reset transistor T8 may be the same as the control signal of the bias transistor T5, such that when the gate of the driving transistor T3 is reset, the second terminal of the driving transistor T3 can also be biased.

That is, in the embodiments of the present disclosure, the bias transistor T5 and the first reset transistor T8 may be controlled by the same signal line to be in an on state or an off state, thereby reducing the number of signal lines in the display panel.

As shown in FIG. 10, the control signal of the second reset transistor T7 can be the same as the control signal of the bias transistor T5 and the first reset transistor T8.

Figure 11:
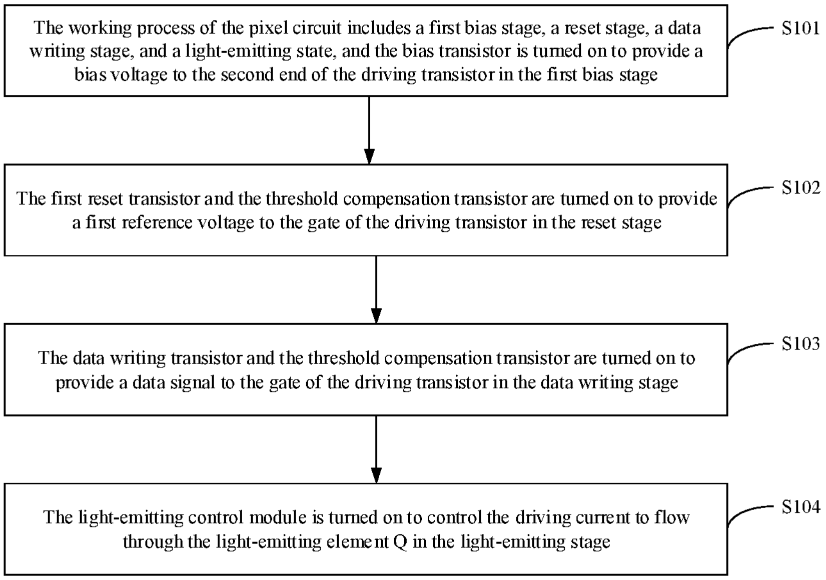
FIG. 11 is a flowchart of a display panel driving method according to an embodiment of the present disclosure.

Based on the foregoing embodiments, an embodiment of the present disclosure further provides a display panel driving method, which can be applied to the display panel provided in any of the foregoing embodiments of the present disclosure. FIG. 11 is a flowchart of a display panel driving method according to an embodiment of the present disclosure. The method will be described in detail below.

S101, the working process of the pixel circuit 12 includes a first bias stage, a reset stage, a data writing stage, and a light-emitting state, and the bias transistor T5 is turned on to provide a bias voltage to the second terminal of the driving transistor T3 in the first bias stage.

S102, first reset transistor T8 and the threshold compensation transistor T4 are turned on to provide a first reference voltage to the gate of the driving transistor T3 in the reset stage.

S103, the data writing transistor T2 and the threshold compensation transistor T4 are turned on to provide a data signal to the gate of the driving transistor T3 in the data writing stage.

S104, the light-emitting control module 13 is turned on to control the driving current to flow through the light-emitting element Q in the light-emitting stage.

More specifically, in the embodiments of the present disclosure, in the first bias stage, the bias transistor may be turned on to provide a bias voltage to the second terminal of the driving transistor T3 to address the threshold shift of the driving transistor T3, and improve the stability of writing the data signal $V_{data}$ to the gate of the driving transistor T3 in the subsequent data writing stage. Based on the stable data signal $V_{data}$ and the biased driving transistor T3, the required driving current can be obtained, that is, the precision of driving current generated by the driving transistor T3 can be improved.

In the data writing stage, the data signal $V_{data}$ may be written to the gate of the driving transistor T3 through the data writing transistor T2, and the driving transistor T3 may generate a corresponding driving current based on the data signal $V_{data}$. At the same time, the threshold compensation transistor T4 may also be in the on stage for detecting and self-compensating the deviation of the threshold voltage of the driving transistor T3, which can also improve the performance of the driving transistor T3 to improve the precision of driving current generated by the driving transistor T3, thereby improving the display effect of the display panel.

In the light-emitting stage, the light-emitting control module 13 may be turned on, the driving current generated by the driving transistor T3 may flow through the light-emitting element Q, and the light-emitting element Q may emit light in response to the driving current. Based on the high-precision driving current, the brightness required by the target can be achieved, thereby improving the display effect of the display panel.

Figure 12:
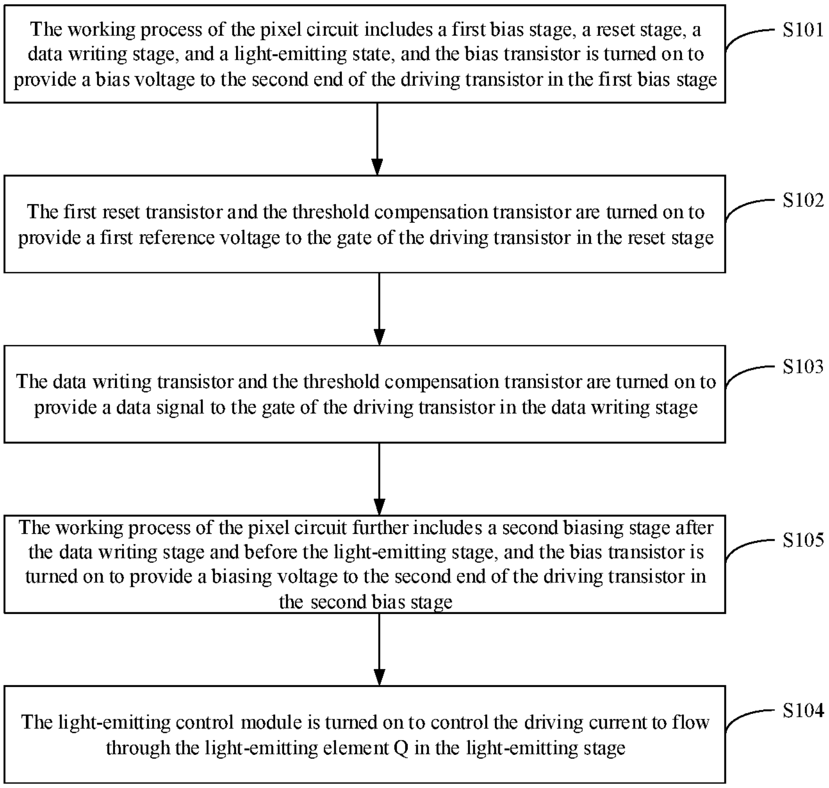
FIG. 12 is a flowchart of another display panel driving method according to an embodiment of the present disclosure.

FIG. 12 is a flowchart of another display panel driving method according to an embodiment of the present disclosure. In some embodiments, the driving method may further include the following process.

S105, the working process of the pixel circuit 12 further includes a second biasing stage after the data writing stage and before the light-emitting stage, the bias transistor T5 is turned on to provide a biasing voltage to the second terminal of the driving transistor T3 in the second bias stage.

More specifically, in the embodiments of the present disclosure, after the writing of the data signal Vdata is completed and before the light-emitting stage, the second terminal of the driving transistor T3 may be biased again to improve the performance of the pixel circuit, such that the light-emitting element Q can achieve the required brightness in the light-emitting stage, thereby improving the display effect of the display panel.

In some embodiments, as shown in FIG. 8, the enable duration of the threshold compensation transistor T4 receiving the control signal may be greater than or equal to 6H, where H represents the unit clock time.

More specifically, in the embodiments of the present disclosure, the enable duration of the threshold compensation transistor T4 receiving the control signal may be greater than or equal to 6H. That is, the effective duration of the threshold compensation transistor T4 being in the on state may be greater than or equal to 6H, which ensures that the gate of the driving transistor T3 can be reset, the data signal $V_{data}$ can be written, and the deviation of the threshold voltage of the driving transistor can be sufficiently detected and self-compensated.

In some embodiments, as shown in FIG. 9, the enable duration of the bias transistor T5 receiving the control signal may be greater than or equal to 6H, where H represents the unit clock time.

More specifically, in the embodiments of the present disclosure, the enable duration of the bias transistor T5 receiving the control signal may be greater than or equal to 6H. That is, the effective duration of the bias transistor T5 being in the on state may be greater than or equal to 6H to sufficiently bias the second terminal of the driving transistor T3 in both the first bias stage and the second bias stage. In this way, the threshold shift of the driving transistor T3 can be avoided, and the stability of the driving current generated by the driving transistor T3 can be improved, thereby improving the display effect of the display panel.

Figure 13:
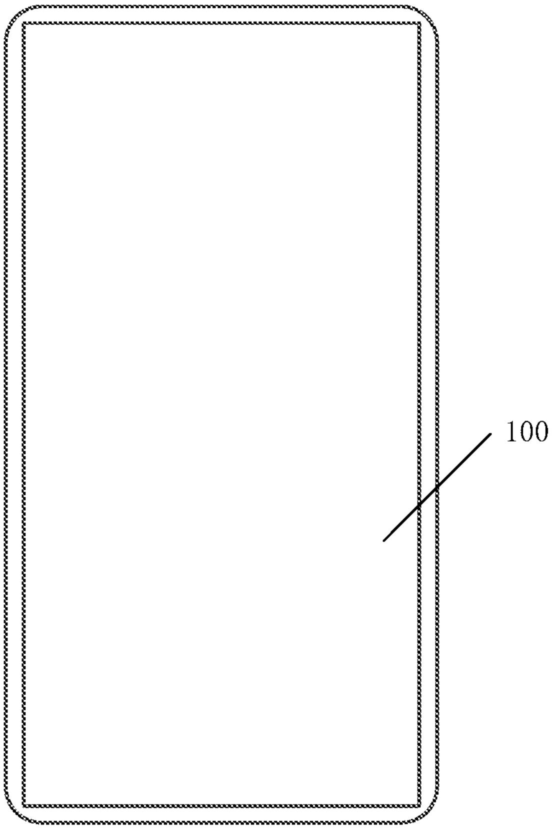
FIG. 13 is a schematic structural diagram of a display device according to an embodiment of the present disclosure.

In some embodiments, based on the foregoing embodiments of the present disclosure, an embodiment of the present disclosure further provides a display device. FIG. 13 is a schematic structural diagram of a display device 100 provided by an embodiment of the present disclosure.

The display device 100 may include any one of the display panels provided in the foregoing embodiments.

Since the display device 100 provided by the embodiment of the present disclosure can include any display panel provided in the foregoing embodiments, the display device 100 can have the same or corresponding technical effects as the display panel provided by the foregoing embodiments.

In some embodiments, the display device 100 may be a mobile phone, a computer, and other electronic devices, etc.

The display panel and a driving method thereof provided by the embodiments of the present disclosure have been described above in detail, and specific examples are used herein to illustrate the principle and embodiments of the present disclosure. The descriptions of the above-mentioned embodiments are only for facilitating the understanding of the method of the present disclosure and the core concept thereof; meanwhile, for a person of ordinary skill in the art, changes can be made in the Detailed Description and application range according to the concept of the present disclosure. In conclusion, the contents of the description should not be considered to limit the present disclosure.

Various embodiments of the present disclosure are described in a progressive manner, and each embodiment focuses on the differences from other embodiments, and the same or similar parts between the various embodiments can be referred to each other. For the device disclosed in the embodiment, since it corresponds to the method disclosed in the embodiments, the description is relatively simple, and the relevant parts can refer to the description of the corresponding method parts.

In the present disclosure, relational terms such as first and second are only used to distinguish one entity or operation from another entity or operation, and do not necessarily require or imply these entities or operations having any such actual relationship or order among them. The terms "including," "containing," or any other variations thereof are intended to encompass non-exclusive inclusion, such that an item or device that includes a series of elements includes not only those elements, but also other elements that are not explicitly listed, or may include elements inherent to such an item or device. Without more restrictions, the elements defined by the sentence "include a . . . " do not exclude the existence of other identical elements in the item or device, which include the above elements.

The above description of the disclosed embodiments enables those skilled in the art to implement or use the present disclosure. Various modifications to these embodiments will be apparent to those skilled in the art. The general principles defined herein may be implemented in other embodiments without departing from the spirit or scope of the disclosure. Therefore, the present disclosure will not be limited to the embodiments shown in the present specification but shall conform to the widest scope consistent with the principles and novel features disclosed in the present specification.

What is claimed is:

1. A display panel comprising:

a pixel circuit, the pixel circuit including a driving transistor, a data writing transistor, a threshold compensation transistor, a first reset transistor, a bias transistor, and a light-emitting control module; and a light-emitting element, wherein:

the data writing transistor is electrically connected to a first terminal of the driving transistor;

the threshold compensation transistor is connected in series between a gate of the driving transistor and a second terminal of the driving transistor, and configured to detect and self-compensate a threshold voltage deviation of the driving transistor;

the first reset transistor is electrically connected to the second terminal of the driving transistor;

the bias transistor is electrically connected to the second terminal of the driving transistor, wherein the first reset transistor and the bias transistor are different transistors, and the bias transistor receives an existing high-level signal in the display panel for biasing the second terminal of the driving transistor without requiring an independent shift register circuit to provide a biasing signal;

the light-emitting control module is connected in series with the driving transistor and the light-emitting element to control whether a driving current flows through the light-emitting element; and the data writing transistor and the first reset transistor have the same transistor type.

2. The display panel of claim 1, wherein:

the data writing transistor and the first reset transistor are P-type transistors.

3. The display panel of claim 1, wherein:

a gate of the data writing transistor is electrically connected to a first scan signal terminal;

a gate of the first reset transistor is electrically connected to a second scan signal terminal; and for the pixel circuits located in adjacent rows, a signal of the second scan signal terminal to which the gate of the first reset transistor of the pixel circuit in a current row is electrically connected is the same as a signal of the first scan signal terminal to which the gate of the data writing transistor of the pixel circuit located in a previous row is electrically connected to.

4. The display panel of claim 1, wherein:

a gate of the bias transistor is electrically connected to a third scan signal terminal;

the pixel circuit further includes a second reset transistor, a first terminal of the second reset transistor being electrically connected to a second reference voltage terminal, a second terminal of the second reset transistor being electrically connected to the light-emitting element, a gate of the second reset transistor being electrically connected to a fourth scan signal terminal; and a signal provided by the third scan signal terminal is the same as a signal provided by the fourth scan signal terminal connected to the same pixel circuit.

5. The display panel of claim 1, wherein:

a gate of the bias transistor is electrically connected to a third scan signal terminal;

the pixel circuit further includes a second reset transistor, a first terminal of the second reset transistor being electrically connected to a second reference voltage terminal, a second terminal of the second reset transistor being electrically connected to the light-emitting element, a gate of the second reset transistor being electrically connected to a fourth scan signal terminal; and for pixel circuits located in two adjacent groups, a signal of the third scan signal terminal to which the gate of the bias transistor of the pixel circuit in a current group is electrically connected is the same as a signal of the fourth scan signal terminal to which the gate of the second reset transistor of the pixel circuit located in a previous group is electrically connected to, one group including two adjacent rows of pixel circuits.

6. The display panel of claim 1, wherein:

an active layer of the threshold compensation transistor includes metal oxide.

7. The display panel of claim 1, wherein:

the pixel circuit further includes a second reset transistor;

the gate of the driving transistor is electrically connected to a first node, the first terminal of the driving transistor is electrically connected to a second node, the second terminal of the driving transistor is electrically connected to a third node;

a gate of the data writing transistor is electrically connected to a first scan signal terminal, a first terminal of the data writing transistor is electrically connected to a data signal terminal, and a second terminal of the data writing transistor is electrically connected to the second node;

a gate of the first reset transistor is electrically connected to a second scan signal terminal, a first terminal of the first reset transistor is electrically connected to a first reference voltage terminal, a second terminal of the first reset transistor is electrically connected to the third node;

a gate of the bias transistor is electrically connected to a third scan signal terminal, a first terminal of the bias transistor is electrically connected to a bias voltage terminal, and a second terminal of the bias transistor is electrically connected to the third node;

a gate of the threshold compensation transistor is electrically connected to a fifth scan signal terminal, a first terminal of the threshold compensation transistor is electrically connected to the third node, and a second terminal of the threshold compensation transistor is electrically connected to the first node;

a gate of the second reset transistor is electrically connected to a fourth scan signal terminal, a first terminal of the second reset transistor is electrically connected to a second reference voltage terminal, and a second terminal of the second reset transistor is electrically connected to a fourth node;

the light-emitting control module includes a first light-emitting control transistor and a second light-emitting control transistor, the first light-emitting control transistor being electrically connected to the second node, a first terminal of the second light-emitting control transistor being electrically connected to the third node, a second terminal of the second light-emitting control transistor being electrically connected to the fourth node, a gate of the first light-emitting control transistor and a gate of the second light-emitting control transistor being electrically connected to a light-emitting control signal terminal; and the light-emitting element is electrically connected to the fourth node.

8. The display panel of claim 1 further comprising:

a first scan circuit, a second scan circuit, a third scan circuit, and a light emission control circuit, the first scan circuit, the second scan circuit, the third scan circuit, and the light emission control circuit including a multi-stage cascaded shift register respectively, wherein:

a control signal of the data writing transistor and a control signal of the first reset transistor are provided by the first scan circuit;

a control signal of the threshold compensation transistor is provided by the second scan circuit;

a control signal of the bias transistor is provided by the third scan circuit; and the light-emitting control module includes a first light-emitting control transistor and a second light-emitting control transistor, control signals of the first light-emitting control transistor and the second light-emitting control transistor being provided by the light emission control circuit.

9. The display panel of claim 8, wherein:

the shift register included in the first scan circuit is a first shift register, a stage of the first shift register being configured to provide the control signal for the data writing transistor of the pixel circuit in a current row and the control signal for the first reset transistor in a next row;

the shift register included in the second scan circuit is a second shift register, a stage of the second shift register being configured to provide the control signal for the threshold compensation transistor of the pixel circuit located in the current two rows;

the shift register included in the third scan circuit is a third shift register, a stage of the third shift register being configured to provide the control signal for the bias transistor of the pixel circuit in the current two rows;

the shift register included in the light emission control circuit is a fourth shift register, a stage of the fourth shift register being configured to provide the control signals for the first light-emitting control transistor and the second light-emitting control transistor of the pixel circuit in the current two rows.

10. The display panel of claim 9, wherein:

an enable duration of the control signal provided by the first shift register is 1 H, an enable duration of the control signal provided by the second shift register is greater than or equal to 6 H, H representing a unit clock time.

11. The display panel of claim 9, wherein:

an enable duration of the control signal provided by the first shift register is 1 H, an enable duration of the control signal provided by the third shift register is greater than or equal to 6 H, H representing a unit clock time.

12. A display panel driving method for a display panel, the display panel including a pixel circuit and a light-emitting element, the pixel circuit including a driving transistor, a data writing transistor, a threshold compensation transistor, a first reset transistor, a bias transistor, and a light-emitting control module, a working process of the pixel circuit including a first bias stage, a reset stage, a data writing stage, and a light-emitting stage, wherein the first reset transistor and the bias transistor are different transistors, and the method comprising:

turning on the bias transistor to provide a bias voltage to a second terminal of the driving transistor in the first bias stage, wherein the bias transistor receives an existing high-level signal in the display panel for providing the bias the voltage to the second terminal of the driving transistor without requiring an independent shift register circuit to provide a biasing signal;

turning on the first reset transistor and the threshold compensation transistor to provide a first reference voltage to a gate of the driving transistor in the reset stage;

turning on the data writing transistor and the threshold compensation transistor to provide a data signal to the gate of the driving transistor in the data writing stage; and turning on the light-emitting control module to control a driving current to flow through the light-emitting element in the light-emitting stage.

13. The method of claim 12, wherein:

the working process of the pixel circuit further includes a second bias stage after the data writing stage and before the light-emitting stage, and the bias transistor is turned on to provide the bias voltage to the second terminal of the driving transistor in the second bias stage.

14. The method of claim 12, wherein:

an enable duration of the bias transistor receiving a control signal is greater than or equal to 6 H, H representing a unit clock time.

15. The method of claim 12, wherein:

an enable duration of the threshold compensation transistor receiving a control signal is greater than or equal to 6 H, H representing a unit clock time.

* * * * *